United States Patent
Carapelli et al.

(10) Patent No.: US 10,778,009 B2
(45) Date of Patent: Sep. 15, 2020

(54) FUEL DISPENSER WITH POWER DISTRIBUTION SYSTEM

(71) Applicant: Gilbarco Inc., Greensboro, NC (US)

(72) Inventors: Giovanni Carapelli, High Point, NC (US); Joseph Long, Oak Ridge, NC (US); Wayne McNinch, Greensboro, NC (US)

(73) Assignee: Gilbarco Inc., Greensboro, NC (US)

( * ) Notice: Subject to any disclaimer, the term of this patent is extended or adjusted under 35 U.S.C. 154(b) by 162 days.

(21) Appl. No.: 15/729,199

(22) Filed: Oct. 10, 2017

(65) Prior Publication Data

US 2018/0102648 A1    Apr. 12, 2018

Related U.S. Application Data

(60) Provisional application No. 62/406,229, filed on Oct. 10, 2016.

(51) Int. Cl.
    *H02J 3/14*          (2006.01)
    *H02J 5/00*          (2016.01)
                   (Continued)

(52) U.S. Cl.
    CPC ............... *H02J 3/14* (2013.01); *B67D 7/04* (2013.01); *B67D 7/22* (2013.01); *B67D 7/42* (2013.01);
                   (Continued)

(58) Field of Classification Search
    CPC ... B67D 7/00; H02J 3/00; H02J 13/00; H01M 8/00
                   (Continued)

(56) References Cited

U.S. PATENT DOCUMENTS 4,034,193 A     7/1977   Jackson
4,831,866 A *   5/1989   Forkert .................. B67D 7/085
                                              700/283
(Continued)

FOREIGN PATENT DOCUMENTS

RU          130313 U1     7/2013
RU        2604763 C1    12/2016

OTHER PUBLICATIONS

International Search Report and Written Opinion dated Jan. 5, 2018 in co-pending PCT application serial No. PCT/US2017/055901, all enclosed pages cited.

*Primary Examiner* — Rexford N Barnie
*Assistant Examiner* — Joseph N Inge
(74) *Attorney, Agent, or Firm* — Nelson Mullins Riley & Scarborough, LLP

(57) ABSTRACT

A fuel dispenser includes a power distribution system having an alternating current (AC) power supply and an AC to direct current (DC) power converter configured to convert a portion of the AC power to DC power for one or more DC peripheral components associated with the fuel dispenser. The power distribution system also includes processing circuitry configured to power down at least one of the DC peripheral components in response to an actuator, cause an indicator to be activated indicating that the DC peripheral components are de-energized and the AC power supply is active, power up the at least one direct current peripheral component in response to the actuator when the direct current peripherals are de-energized, and cause the indicator to be activated to indicate that both the DC peripheral components and the AC power supply are active.

19 Claims, 6 Drawing Sheets

(51) Int. Cl.
*H02J 9/06* (2006.01)
*B67D 7/22* (2010.01)
*H02J 13/00* (2006.01)
*B67D 7/04* (2010.01)
*B67D 7/42* (2010.01)
*H02M 7/02* (2006.01)

(52) U.S. Cl.
CPC ............... *H02J 5/00* (2013.01); *H02J 9/061* (2013.01); *H02J 13/00001* (2020.01); *H02M 7/02* (2013.01); *Y02B 70/3225* (2013.01); *Y02B 70/3291* (2013.01); *Y02B 90/222* (2013.01); *Y04S 20/12* (2013.01); *Y04S 20/222* (2013.01); *Y04S 20/248* (2013.01)

(58) Field of Classification Search
USPC .......................................................... 307/11
See application file for complete search history.

(56) References Cited

U.S. PATENT DOCUMENTS

| | | | |
|---|---|---|---|
| 5,040,577 A * | 8/1991 | Pope | B67D 7/0486 141/59 |
| 5,638,991 A * | 6/1997 | Todden | B67D 1/0006 222/113 |
| 5,784,231 A | 7/1998 | Majid et al. | |
| 5,954,080 A | 9/1999 | Leatherman | |
| 6,404,348 B1 * | 6/2002 | Wilfong | G01R 19/2513 340/538.17 |
| 6,428,918 B1 * | 8/2002 | Fuglevand | H01M 8/04365 429/431 |
| 6,435,204 B2 | 8/2002 | White et al. | |
| 7,259,481 B2 | 8/2007 | Eaton et al. | |
| 8,291,928 B2 | 10/2012 | Reid et al. | |
| 2003/0025397 A1 | 2/2003 | Young et al. | |
| 2006/0260680 A1 * | 11/2006 | Reid | B67D 7/3218 137/68.14 |
| 2007/0119859 A1 * | 5/2007 | Harrell | G07F 9/026 222/52 |
| 2007/0124606 A1 * | 5/2007 | Hsieh | G06F 1/3215 713/300 |
| 2009/0087806 A1 * | 4/2009 | Zuzek | B67D 7/06 432/29 |
| 2009/0293989 A1 * | 12/2009 | Yang | B67D 7/076 141/83 |
| 2013/0121428 A1 | 5/2013 | Carapelli et al. | |
| 2014/0238534 A1 * | 8/2014 | Bartlett | B67D 7/04 141/11 |
| 2014/0300372 A1 * | 10/2014 | Benton | B67D 7/34 324/537 |
| 2016/0016783 A1 * | 1/2016 | Rubin-Ayma | B67D 7/04 141/94 |
| 2016/0148181 A1 * | 5/2016 | Prosperie, III | G07F 13/025 705/16 |
| 2017/0096327 A1 * | 4/2017 | Schuster | F04B 23/00 |

* cited by examiner

FUEL DISPENSER WITH POWER DISTRIBUTION SYSTEM

PRIORITY CLAIM

This application is based upon and claims the benefit of U.S. provisional application Ser. No. 62/406,229, filed Oct. 10, 2016, which is relied upon and incorporated herein by reference in its entirety for all purposes.

BACKGROUND

The present invention relates generally to equipment used in fuel dispensing environments. More specifically, embodiments of the present invention relate to a fuel dispenser power distribution system.

Fuel dispensers typically include several alternating current (AC) and direct current (DC) subsystems and peripherals. These subsystems and/or peripherals may need to be updated over the life cycle of the fuel dispenser.

Fuel dispensers may be subject to variations in AC power supply connectivity and/or quality. Additionally, fuel dispensers may suffer from component failures, due to such events as power glitches, power surges, lightning strike, electrostatic discharge (ESD), or the like. However, it may be difficult to verify the cause of the component failures without costly and/or complicated monitoring equipment.

SUMMARY

The present invention recognizes and addresses various considerations of prior art constructions and methods. According to one aspect, the present invention provides a fuel dispenser power distribution system, often including a power distribution module (PDM), including an alternating current power supply configured to receive alternating current power from a power source and supply alternating current power to one or more alternating current loads associated with the fuel dispenser, an alternating current to direct current power converter configured to convert a portion of the alternating current power to direct current power for one or more direct current peripheral components associated with the fuel dispenser, and processing circuitry (e.g., including a suitable microcontroller). The processing circuitry may be configured to power down at least one of the direct current peripheral components in response to a power control actuator when the direct current peripheral components are energized, cause an indicator to be activated indicating that at least one direct current peripheral component is deenergized and the alternating current power supply is active, power up at least one direct current peripheral component in response to the power control actuator when the at least one direct current peripheral component is deenergized, and cause the indicator to be activated to indicate that both at least one direct current peripheral component is energized and the alternating current power supply is active.

In a further example embodiment, a fuel dispenser power distribution system is provided including an alternating current power supply configured to receive alternating current power from a power source and supply alternating current power to one or more alternating current loads associated with the fuel dispenser, an alternating current to direct current power converter configured to convert a portion of the alternating current power to direct current power for one or more direct current peripheral components associated with the fuel dispenser, and processing circuitry. The processing circuitry is configured to establish secured communication with a remote computing device, power down one or more direct current peripheral components in response to receiving a remote power down communication when the one or more direct current peripheral components are energized, cause an indicator to be activated to indicate that the direct current peripheral components are deenergized and the alternating current loads are energized, power up the direct current peripheral components in response to receiving a remote power up communication when the direct current peripheral components are deenergized, and cause the indicator to be activated to indicate that both the direct current peripheral components and the alternating current power supply is active.

The remote computing device can be located anywhere in the world if the dispenser is Internet-connected. The cloud connection processor (CCP) may be provided within the dispenser to enable such connections, preferably utilizing encrypted communications. The PDM microcontroller communicates with the CCP. In this way all operational and statistical data from the power distribution modules (PDMs) for a group of dispensers can be monitored and aggregated at a central command and control facility.

In another example embodiment, a fuel dispenser power distribution system is provided including an alternating current power supply configured to receive alternating current power from a power source and supply alternating current power to one or more alternating current loads associated with the fuel dispenser, an alternating current to direct current power converter configured to convert a portion of the alternating current power to direct current power for one or more direct current peripheral components associated with the fuel dispenser, and processing circuitry. The processing circuitry may be configured to record power quality information or energy consumption associated with the one or more direct current peripheral components and cause the power quality information or energy consumption associated with the one or more direct current peripheral components to be displayed on a user interface.

Additional embodiments may include systems and methods similar to those described above with respect to the fuel dispenser power distribution systems.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one skilled in the art, is set forth in the specification, which makes reference to the appended drawings, in which.

DETAILED DESCRIPTION OF PREFERRED EMBODIMENTS

Figure 1:
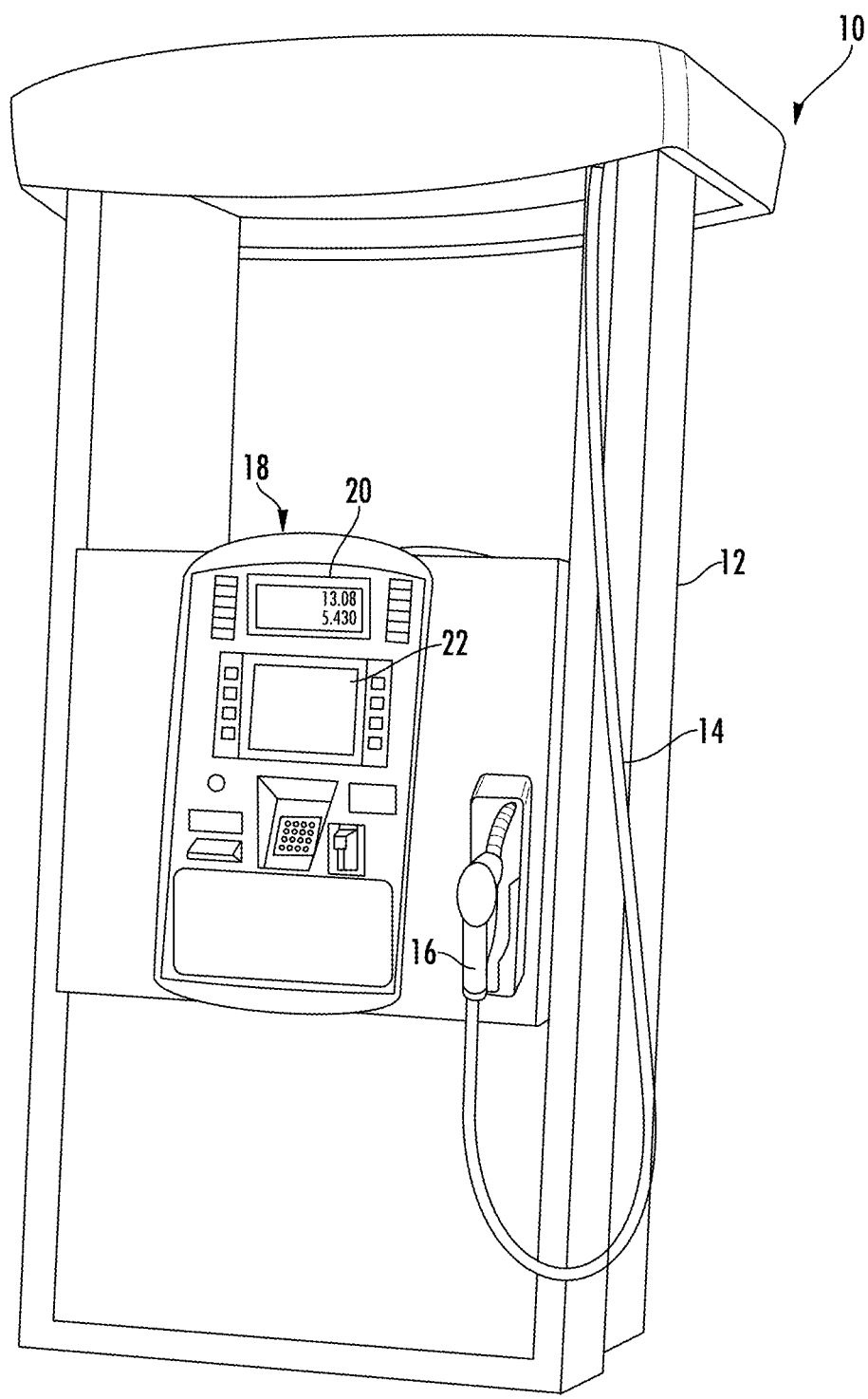
FIG. 1 illustrates a perspective view of an exemplary fuel dispenser in accordance with an embodiment of the present invention.

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the present disclosure including the appended claims and their equivalents.

A fuel dispenser power distribution system according to the present invention may provide historical and real time power quality monitoring, as well as staged power control for rebooting and disabling individual fuel dispenser peripherals. The fuel dispenser power distribution system may provide control and monitoring functionality remotely such as through a secured, e.g., encrypted, communication link with a remote computing device, as well as locally to personnel servicing the dispenser.

In an example embodiment, the fuel dispenser power distribution system may include processing circuitry, which is configured to de-energize, or power down, the DC peripherals of the fuel dispenser in response to an interrupt switch being actuated, e.g., depressed, for a predetermined period of time. The processing circuitry may also cause an indicator, e.g., one or more light emitting diodes (LEDs), to be illuminated in a predetermined pattern to indicate that the DC peripherals are de-energized and the AC loads are energized. The processing circuitry may be further configured to energize, e.g., power up, the DC peripherals, in response to a further actuation of the interrupt switch for the predetermined period of time. The processing circuitry may also cause the indicator to indicate that both the DC peripherals and the AC loads are energized.

In some example embodiments, the processing circuitry of the fuel dispenser may be configured to establish secured communication with a remote computing device and receive power down, power up, and/or reboot communications from the remote computing device. The processing circuitry may de-energize, energize, or cycle power to the DC peripheral components in response to the respective communications from the remote computing device.

In some example embodiments, the fuel dispenser power distribution system may record or monitor power quality information or energy consumption associated with one or more of the DC peripheral components. In an example embodiment, the processing circuitry may cause the power quality information or energy consumption to be transmitted to a remote computing device, to enable remote monitoring of the power supplied to the DC peripheral components. Additionally or alternatively, the processing circuitry may cause the power quality information or energy consumption to be displayed on a user interface, such as one or more LEDs associated with the fuel dispenser power distribution system. In some examples, the user interface may be a single LED which may display real time power quality information and/or historical dispenser power state information as a blink code. The user interface and/or blink code may enable a technician to know the current and historic power quality without running a diagnostic or attaching diagnostic equipment.

In an example embodiment, the fuel dispenser power distribution system may include an energy storage circuit having at least one power storage element, such as a battery or capacitor, to maintain the supplied voltage within the predetermined voltage range, such as during an interruption of power, or during high dispenser transient loads, for example associated with thermal receipt or coupon printing. The power storage element may store sufficient power to allow the processing circuitry to power down one or more of the DC peripheral components to avoid component faults and/or failures, and to ensure that critical subsystems such as the pump control node can save transaction volume and money totals in non-volatile memory, by powering off non-critical subsystems immediately upon detection of power loss transients. This allows for selection of an AC to DC power supply having minimum necessary power output and associated cost, while having the highest possible energy efficiency.

Some embodiments of the present invention may be particularly suitable for use with a fuel dispenser in a retail service station environment, and the below discussion will describe some preferred embodiments in that context. However, those of skill in the art will understand that the present invention is not so limited. In fact, it is contemplated that embodiments of the present invention may be used with any fluid dispensing environment and with other fluid dispensers. For example, embodiments of the present invention may also be used with diesel exhaust fluid (DEF) dispensers, compressed natural gas (CNG) dispensers, and liquefied petroleum gas (LPG) and liquid natural gas (LNG) applications, among others.

Example Fuel Dispenser

FIG. 1 is a perspective view of an exemplary fuel dispenser 10 according to an embodiment of the present invention. Fuel dispenser 10 includes a housing 12 with a flexible fuel hose 14 extending therefrom. Fuel hose 14 terminates in a manually-operated fuel nozzle 16 adapted to be inserted into a fill neck of a vehicle's fuel tank. Fuel nozzle 16 includes a fuel valve. Various fuel handling components, such as valves and meters, are also located inside of housing 12. These fuel handling components allow fuel to be received from underground piping and delivered through fuel hose 14 and fuel nozzle 16 to a vehicle's fuel system, e.g. fuel tank.

Fuel dispenser 10 has a customer interface 18. Customer interface 18 may include an information display 20 relating to an ongoing fueling transaction that shows the amount of fuel dispensed and the price of the dispensed fuel. Further, customer interface 18 may include a display 22 that provides instructions to the customer regarding the fueling transaction. Display 22 may also provide advertising, merchandising, and multimedia presentations to a customer, and may allow the customer to purchase goods and services other than fuel at the dispenser.

Figure 2:
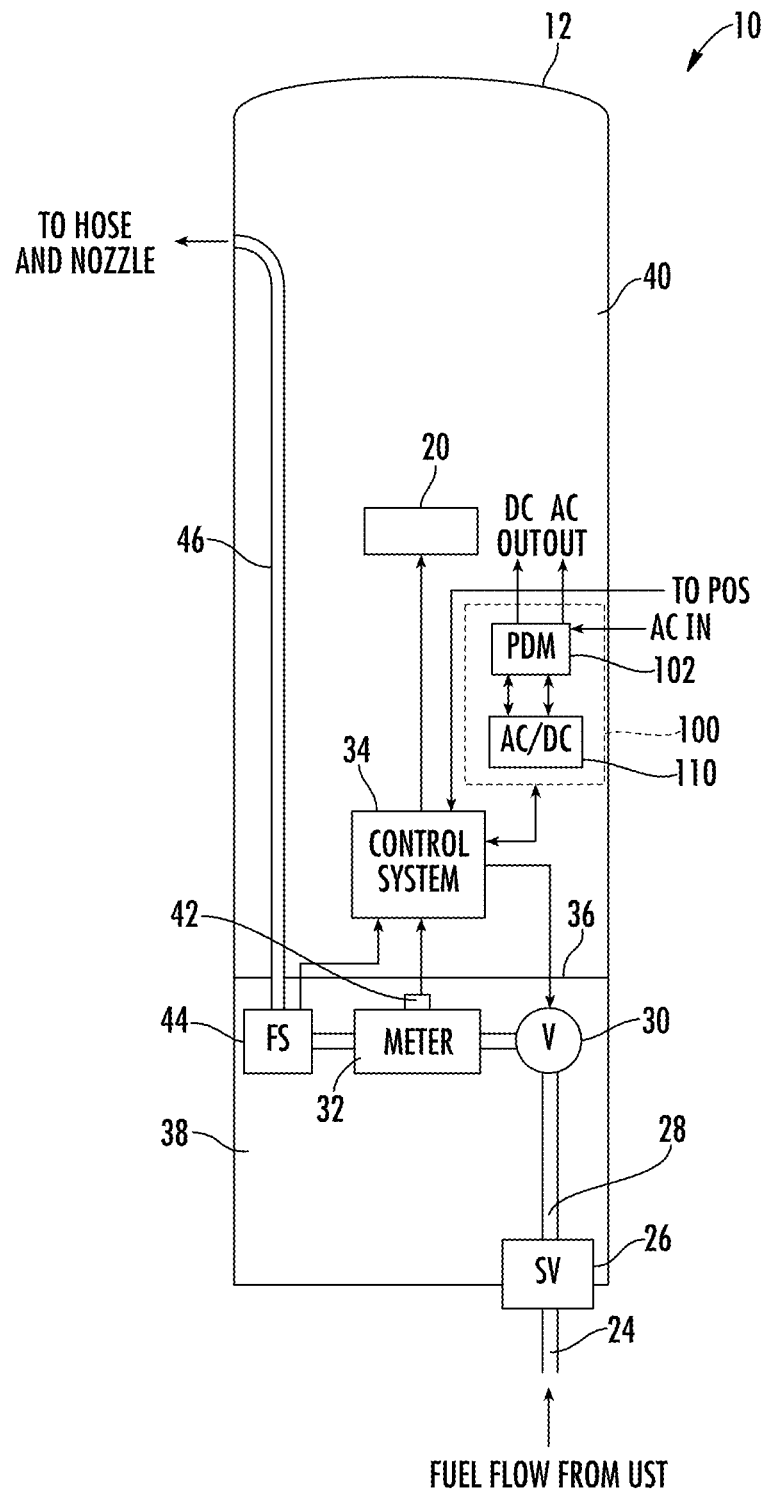
FIG. 2 illustrates a diagrammatic representation of internal components of the fuel dispenser of FIG. 1 according to an embodiment of the present invention.

FIG. 2 is a schematic illustration of internal fuel flow components of fuel dispenser 10 according to an embodiment of the present invention. In general, fuel may travel from an underground storage tank (UST) via main fuel piping 24, which may be a double-walled pipe having secondary containment as is well known, to fuel dispenser 10 and nozzle 16 for delivery. An exemplary underground fuel delivery system is illustrated in U.S. Pat. No. 6,435,204, hereby incorporated by reference in its entirety for all purposes. More specifically, a submersible turbine pump (STP) associated with the UST is used to pump fuel to the fuel dispenser 10. However, some fuel dispensers may be self-contained, meaning fuel is drawn to the fuel dispenser 10 by a pump unit positioned within housing 12.

Main fuel piping 24 passes into housing 12 through a shear valve 26. As is well known, shear valve 26 is designed to close the fuel flow path in the event of an impact to fuel dispenser 10. U.S. Pat. No. 8,291,928, hereby incorporated by reference in its entirety for all purposes, discloses an exemplary secondarily-contained shear valve adapted for use in service station environments. Shear valve 26 contains an internal fuel flow path to carry fuel from main fuel piping 24 to internal fuel piping 28.

Fuel from the shear valve 26 flows toward a flow control valve 30 positioned upstream of a flow meter 32. Alternatively, valve 30 may be positioned downstream of the flow meter 32. In one embodiment, valve 30 may be a proportional solenoid controlled valve, such as described in U.S. Pat. No. 5,954,080, hereby incorporated by reference in its entirety for all purposes.

Flow control valve 30 is under control of a control system 34. In this manner, control system 34 can control the opening and closing of flow control valve 30 to either allow fuel to flow or not flow through meter 32 and on to the hose 14 and nozzle 16. Control system 34 may comprise any suitable electronics with associated memory and software programs running thereon whether referred to as a processor, microprocessor, controller, microcontroller, or the like. In a preferred embodiment, control system 34 typically includes a pump control node (PCN) and a "card reader in dispenser" (CRIND) module. The PCN includes the hardware and software necessary to control the dispenser's hydraulic functions. The CRIND module includes the hardware and software necessary to support payment processing and peripheral interfaces, such as PIN pad, card reader, and the displays(s). The CRIND module may, for example, inform the PCN that a transaction has been authorized, which in turn causes valve 30 to open. In addition, control system 34 may be in electronic communication with a site controller located at the fueling site. The site controller, which may take the form of or be incorporated into a point-of-sale (POS) system, communicates with control system 34 to control authorization of fueling transactions and other conventional activities. An example embodiment of the control system 34 is discussed below in reference to FIG. 5.

A vapor barrier 36 delimits hydraulics compartment 38 of fuel dispenser 10, and control system 34 is located in electronics compartment 40 above vapor barrier 36. Fluid handling components, such as flow meter 32, are located in hydraulics compartment 38. In this regard, flow meter 32 may be any suitable flow meter known to those of skill in the art, including positive displacement, inferential, and Coriolis mass flow meters, among others. Meter 32 typically comprises electronics 42 that communicates information representative of the flow rate or volume to control system 34. For example, electronics 42 may typically include a pulser as known to those skilled in the art. In this manner, control system 34 can update the total gallons (or liters) dispensed and the price of the fuel dispensed on information display 20.

As fuel leaves flow meter 32 it enters a flow switch 44, which preferably comprises a one-way check valve that prevents rearward flow through fuel dispenser 10. Flow switch 44 provides a flow switch communication signal to control system 34 when fuel is flowing through flow meter 32. The flow switch communication signal indicates to control system 34 that fuel is actually flowing in the fuel delivery path and that subsequent signals from flow meter 32 are due to actual fuel flow. Fuel exits flow switch 44 through internal fuel piping 46 to fuel hose 14 and nozzle 16 for delivery to the customer's vehicle.

A blend manifold may also be provided downstream of flow switch 44. The blend manifold receives fuels of varying octane levels from the various USTs and ensures that fuel of the octane level selected by the customer is delivered. In addition, fuel dispenser 10 may comprise a vapor recovery system to recover fuel vapors through nozzle 16 and hose 14 to return to the UST. An example of a vapor recovery assist equipped fuel dispenser is disclosed in U.S. Pat. No. 5,040,577, incorporated by reference herein in its entirety for all purposes.

The various peripherals and other components of fuel dispenser 10 may require AC and/or DC voltage of different voltage levels for their operation. Toward this end, fuel dispenser 10 includes a power distribution system 100 in accordance with the present invention. Power distribution system 100 preferably receives AC mains power at a known nominal level and provides both AC and DC power. For example, the AC power may be at the same or a different voltage level than the input voltage. In addition, the DC voltage can be supplied at a particular voltage level at or slightly higher than the level required for the various peripherals. Each such peripheral may have an associated voltage regulator to provide the precise voltage level that it requires.

Example Power Distribution System

Figure 3:
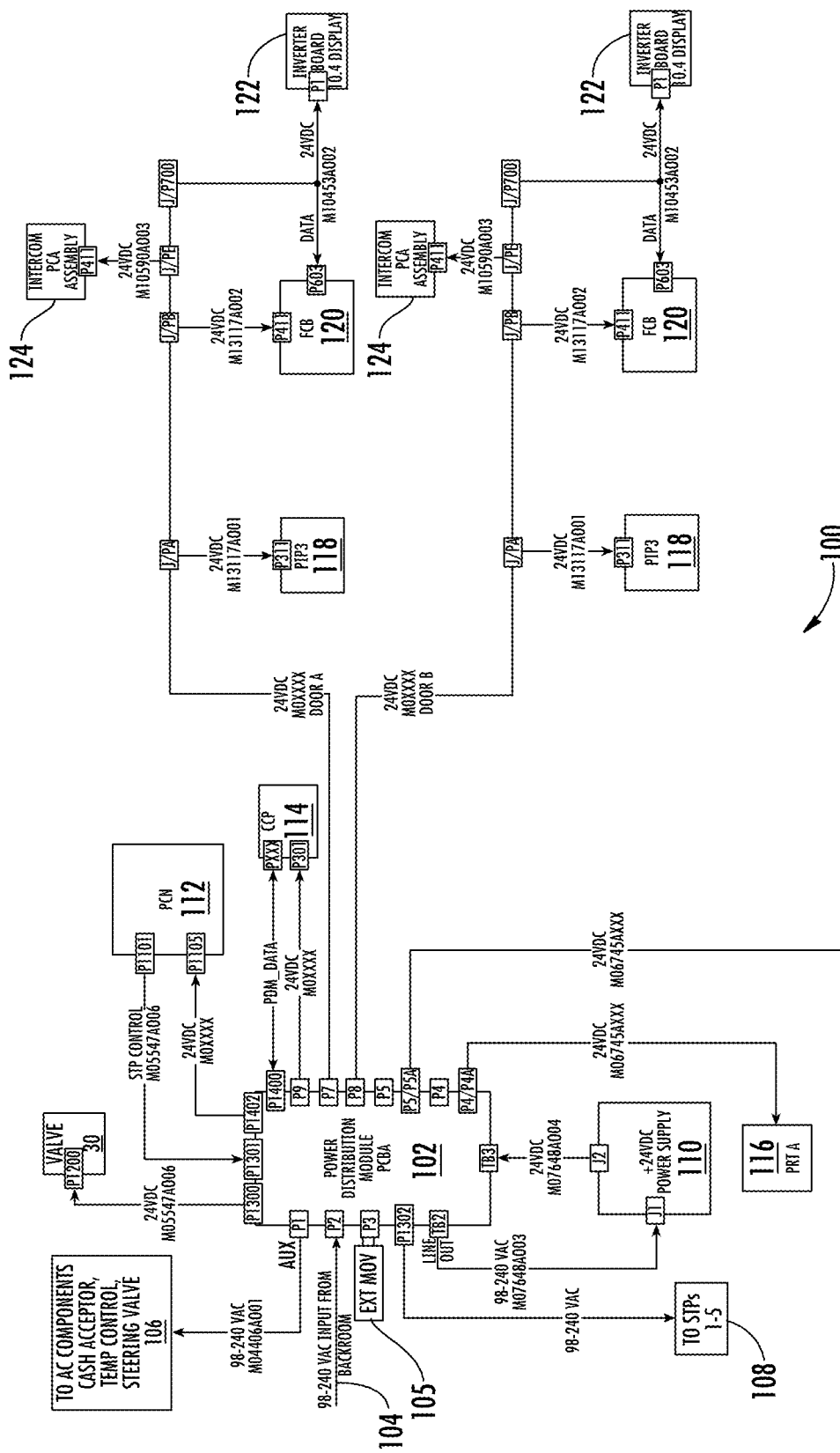
FIG. 3 illustrates a schematic diagram of an example power distribution system according to an embodiment of the present invention.

FIG. 3 illustrates an example of power distribution system 100. As shown, power distribution system 100 may include a power distribution module (PDM) 102 including a printed circuit board assembly (PCBA) configured to distribute AC and DC power to various loads. The PDM 102 may receive AC power from an external AC power source 104, such as a mains supply associated with the gas station or other fueling environment. The AC power source 104 may typically supply voltage at a level within the range of 98-240 VAC depending on the local available voltage. The PDM 102 may supply various AC loads 106 such as a cash accepter, temperature controller, a steering valve, or the like. Additionally, the PDM 102 may supply AC power to one or more STPs 108. The PDM 102 may also provide AC power to one or more external metal oxide varistors (EXT MOV) 105. The clamping voltage threshold of these external metal oxide varistors can be chosen to be slightly higher than the local available voltage, such that the fuel dispenser electronic components are protected from fast high voltage transients on its AC input. Because they are external, they can be replaced if damaged. The PDM processor can indicate the likelihood that they are damaged based on historical power quality monitoring, and this can be reported to a remote computing device. Furthermore, because the metal oxide varistors are external, the PDM 102 does not have to be specified or built as a function of local available voltage.

Further, the PDM 102 may supply AC power to an AC to DC converter 110. The AC to DC converter may provide DC power back to the PDM 102 for distribution to DC peripheral components. In the depicted embodiment, the AC to DC converter 110 provides 24 VDC to the PDM for DC power distribution.

In the illustrated embodiment, the PDM 102 may provide DC power to, for example, the flow control valve 30, PCN 112, and a cloud connection processor (CCP) 114. The PCN 112 may be configured to provide control signals to one or more of the STPs 108 as well as to various hydraulic components of the fuel dispenser. The CCP 114 may be configured to provide secure communication, wired or wireless, to a server or other remote computing device, as discussed below in reference to FIG. 5, for monitoring or control of aspects of the fuel dispenser 10. The CCP 114 may send and receive PDM data to and from the PDM 102 and/or the remote computing device.

The PDM 102 may provide DC power to DC peripheral components, such as one or more thermal printers (PRTs) 116, and/or one or more peripheral interface PCBAs 118. In this case, two printers (designated "A" and "B") are provided corresponding to the two sides of the fuel dispenser. The PDM may also provide DC power to one or more Flexpay control boards (FCB) 120, one or more display backlights 122, and/or one or more intercom printed circuit assemblies 124. The FCB 120 may be configured to provide display data to the displays 122 and/or to receive data from the display, such as user input.

Figure 4:
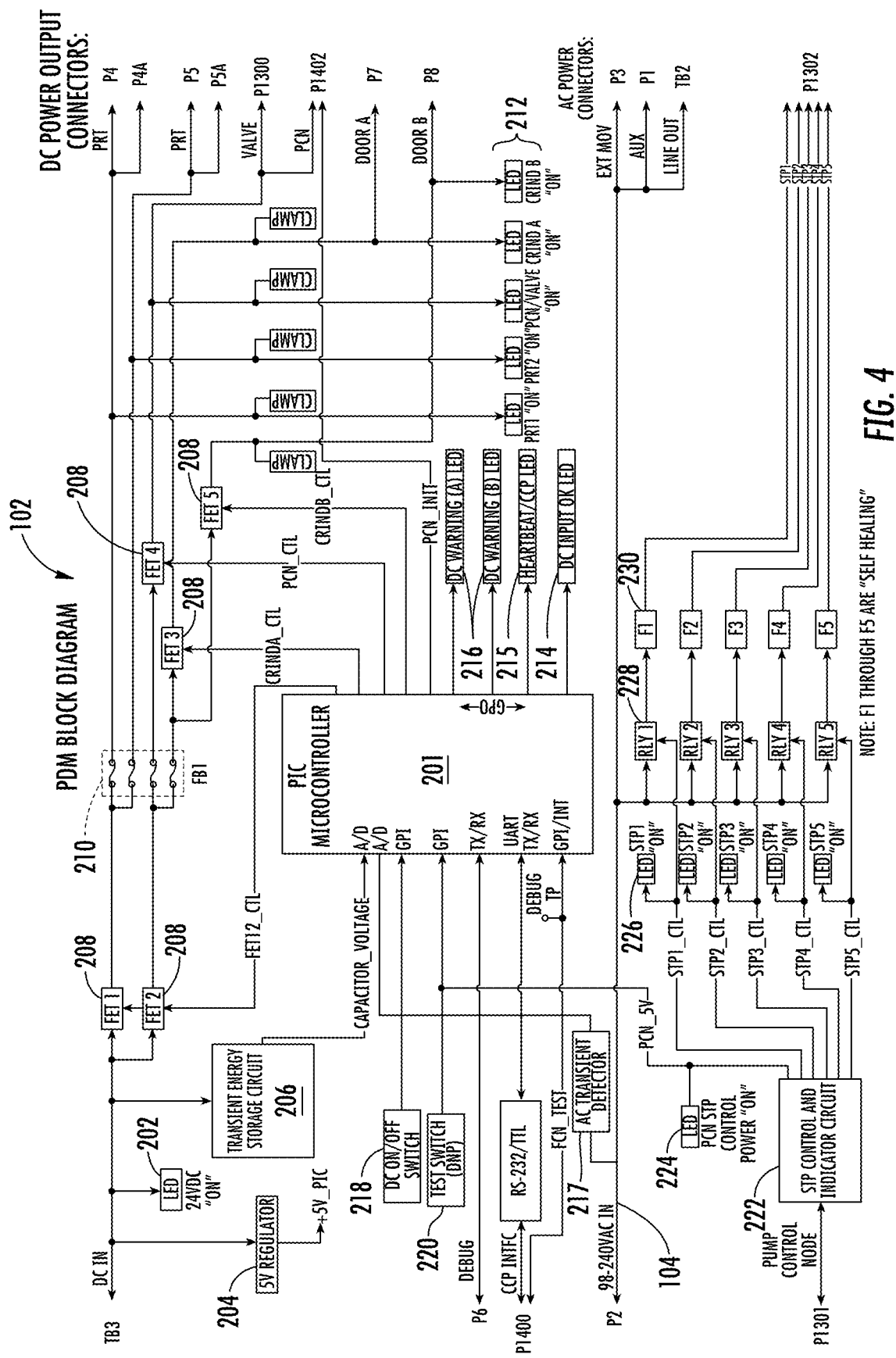
FIG. 4 illustrates a schematic diagram of an example power distribution module according to an embodiment of the present invention.

FIG. 4 illustrates a schematic of an example PDM 102 including a microcontroller 201. The PDM 102 may pass the AC power directly to the EXT MOV 105, auxiliary connection, and/or a line out terminal. The transient detector 217 supplies a properly scaled analog signal to the microcontroller 201 for evaluation of AC line transients. The PDM 102 may receive control signals from the PCN 112 at a STP control and indicator circuit 222. The STP control and indicator circuit 222 may be powered by 5 VDC from the microcontroller 201 which also energizes a PCN STP control power "on" indicator 224. Alternately, a serial communications interface from the microcontroller 201 to the PCN can be utilized for STP control. In an example embodiment, the PCN STP control power "on" indicator 224 may comprise an LED. In response to a control signal from the PCN 112, the STP control and indicator circuit 222 may energize a respective relay 228 providing AC power from the AC power supply to a selected one of the STPs. An STP "On" indicator 226, e.g. LED, may be provided such that the STP "On" indicator is energized when the respective relay 228 is energized. Furthermore, statistics such as run time of particular STPs, can be conveyed to remote computing equipment by the microcontroller 201 for use in evaluating STP wear and site fuel grade sales statistics. In some example embodiments, fuses 230 may be provided in the respective AC power paths to prevent an overcurrent condition at the associated STP, which may result in damage to the STP. In an example embodiment, the fuses 230 may be self healing, e.g. the fuse may reestablish electrical conductivity after a predetermined period, such as a cool down period. Alternatively, in other embodiments one or more of the fuses 230 may not be self healing.

The PDM 102 may also receive DC power in from the AC to DC converter 110, which may supply 24 VDC. In an example embodiment, the incoming DC power may cause a DC "On" indicator 202 to illuminate, thus indicating that DC power is being supplied to the PDM 102. The incoming DC power may also feed a DC-DC converter 204 configured to increase or decrease the voltage of the supplied DC power. In the depicted example, the DC-DC converter 204 is configured to output 5 VDC for powering the microcontroller 201 and/or other components of PDM 102 that require this voltage level.

The DC power supply may also provide DC power to a transient energy storage circuit 206 configured to maintain the DC power in a predetermined voltage range, such as 18-24 volts. The storage circuit 206 may be configured to maintain the DC power within a preferred, nominal operating band, such as 24 VDC+/−0.6 VDC during normal operations. Toward this end, the storage circuit 206 may include one or more power storage elements, such as auxiliary batteries, capacitors, or the like, configured to store power during normal operations and discharge DC power during an interruption or variation of power, such as a temporary dip in voltage or a loss of power, or due to transient loads within the dispenser, for example due to thermal printing of receipts or coupons. In some example embodiments, the storage capacity of the power storage element(s), e.g. capacitance or battery capacity, may be proportional to the number and/or type of DC peripheral loads. The power storage elements may supplement the DC power supplied or, in an instance in which power is lost, supply the DC power to the DC peripheral components. The power storage elements may maintain the DC power within the predetermined voltage range (18-24 VDC) until the stored power is depleted or external power is restored. Advantageously, the power storage elements may include sufficient storage capacity to allow the microcontroller 201 to power down the DC peripheral components in a sequential way during a loss of power. Such sequencing can provide priority to certain peripherals, such as for the PCN to preserve transaction volume and money totals upon detection of a power off transient.

As discussed above, DC power may be supplied to the PRTs 116, the flow control valve 30, pump control node 112, as well as the payment subsystem (CRIND) and user interface components for each fueling position (labeled "Door A" and "Door B"). In this regard, the microcontroller 201 may be configured to control the DC power supplied to the DC peripheral components by turning on and off respective electronic switches 208, such as field effect transistors (FETs). The PDM 102 may further include one or more fuses 210 in the DC power path configured to open to prevent an over current condition from causing damage to the DC peripheral components. In some example embodiments, the fuses 210 may or may not be self healing. Alternatively, in other embodiments one or more of the fuses 210 may not be self healing.

The PDM 102 may include a respective DC power "On" indicator (collectively indicated at 212) for each or combinations of the peripheral components. The DC power "On" indicators 212 may comprise LEDs.

In an example embodiment, the PDM 102 may monitor and/or record, e.g. store to memory, power quality information and/or power consumption information. The PDM 102 may compare the DC power voltage to a predetermined operating range, such as 18-24 VDC, and/or a preferred or nominal operating range, such as 24+/−0.6 VDC. Alternatively, or in addition, the PDM 102 may compare a current value for one or more of the DC peripheral components (for example the current of each DC peripheral component, groups of two or more DC peripheral components, all of the DC peripheral components, or a combination thereof) to a nominal current value. The nominal current value may be a normal operating current, or the normal operating current with an error margin, such as 0.1 A, 1 A, 3 A, or the like. The normal operation current may be based on circuit design or operational testing. The PDM 102 can also monitor the scaled down AC voltage output of the transient detector to determine deviations from nominal line levels.

The PDM 102 may also include various visual indicators, including status indicator 214, heartbeat indicator 215, and warning indicators 216. Indicator 214, which may typically comprise an LED, is activated by microcontroller 201 to display historical power quality information, such as via a blink code, and/or real time power quality information, such as an indication of nominal DC voltage. For example, indicator 214 may indicate that DC power is being maintained within the predetermined normal operation range and/or the nominal operating range, such as by a constant illumination; or indicate a previous power problem, such as by a blink pattern or code. In some example embodiments, the microcontroller 201 may record or monitor the DC power supply and AC line voltage from installation, a last full power up, e.g. AC and DC power supplies energized from a de-energized condition, or in response to a communication received by the CCP 114, that the microcontroller 210 may convey to a remote computing device. The blink code may additionally include a fault type code and, in some instances, a fault type statistic, e.g. number of times the specific fault type has occurred following a pause, such as one second.

For example, the historical dispenser power state may be initially displayed as "okay" (constant "on") or "previous problems detected" (e.g., a slow blinking pattern). For "previous problems detected," indicator 214 may provide an initial blink code for "type of fault" followed by a blink code for "fault statistic" (such as after an intervening 1-second off period). In this regard, Table I includes, without limitation, example fault type codes and Table II includes, without limitation, example fault statistic codes, which may occur at a known blink rate, e.g., four flashes per second (4 fps):

TABLE I

| Fault | Code |
| --- | --- |
| Brownout | 1 Blink |
| Shutdown | 2 Blinks |
| False Shutdown | 3 Blinks |
| Voltage Below Nominal Value | 4 Blinks |
| Voltage Above Nominal Value | 5 Blinks |
| Excessive Power Consumption | 6 Blinks |

TABLE II

| Fault Statistic | Code |
| --- | --- |
| 1 to 3 events since last start, minimum 1 hour between events | 1 Blink |
| 4 to 10 events since last start, minimum 1 hour between events | 2 Blinks |
| 11 to 30 events since last start, minimum 1 hour between events | 3 Blinks |
| 1 to 15 events within one hour, 1 to 5 occurrences meeting this criteria | 4 Blinks |
| 1 to 15 events within one hour, 6 to 20 occurrences meeting this criteria | 5 Blinks |
| 1 to 15 events within one hour, 21 or more occurrences meeting this criteria | 6 Blinks |

Turning to the real time power quality state, the microcontroller 201 may cause the indicator 214 to blink in a predetermined pattern to indicate the real time power quality of the DC power supply. For example, indicator 214 may be constantly illuminated or blinking slowly, e.g. once per second, in an instance in which the DC power is within the nominal voltage range. In an instance in which the DC power is not within the nominal voltage range but is within a predetermined operational range, indicator 214 may flash rapidly, such as several times a second. Additionally, the PDM may power down the DC peripheral components in response to the DC power being outside of the predetermined operational range. Table III includes, without limitation, example flash rates for the real time power quality state.

TABLE III

| DC Voltage | Flash rate |
| --- | --- |
| 23.4 to 24.6 VDC, Nominal voltage | On or ~1 flash per second (FPS) |
| 18 to 24.5 VDC Below nominal voltage, but within operational limit | 18 FPS |
| 15 to 17.9 VDC Below nominal voltage, DC is switched off to all peripherals by the PDM | 12 FPS |
| 12 to 14.9 VDC Below nominal voltage, DC is switched off to all peripherals by the PDM | 9 FPS |
| 7 to 11.9 Below nominal voltage, DC is switched off to all peripherals by the PDM | 6 FPS |
| 12 to 14.9 Below nominal voltage, DC is switched off to all peripherals by the PDM | Off |

By observing indicator 214, a technician may instantly detect if the voltage is acceptable, or if the dispenser is operating with a potential power quality problem. Similarly, by observing that indicator 214 is off or flashing at 6-12 FPS, such as during an AC off or AC on event, the technician may determine if a power quality problem exists. Because the amount of capacitance is proportional to the number and type of dispenser peripherals, as discussed above, the technician can also, via comparative experience, determine if a particular dispenser has a potential load-related problem within the DC distribution system.

Indicator 215 may also remain "on" or blink in a predetermined manner, including conveying blink codes, for example, to indicate the state of communications with the remote computing device (via CCP 114).

In some example embodiments, the PDM 102 may include a suitable power control actuator such as an interrupt switch 218, e.g. a DC On/Off switch. In an example embodiment, the warning indicators 216 may be one or more red LEDs and the interrupt switch may be a normally open pushbutton switch, such as a microswitch. The microcontroller 201 may power down, or de-energize (e.g., via switches 208), the DC peripheral components in response to actuation of the interrupt switch 218 for a predetermined period of time, such as 1 second. When this occurs, the microcontroller 201 may cause one or both of the DC warning indicators 216 to be illuminated in a predetermined pattern indicating that the DC peripheral components are de-energized and the AC loads are energized. In an example embodiment, the DC warning indicators 216 comprise two red LEDs, which flash in an alternating pattern, similar to a railroad crossing signal, to indicate that the direct current peripheral components are de-energized and the AC loads are energized. The microcontroller 201 may power up, e.g. energize, the DC peripheral components in response to actuation of the interrupt switch 218 for the predetermined period of time when the DC peripherals are de-energized. The microcontroller 201 may also cause the DC warning indicator 216 to indicate that both the direct current peripheral components and the alternating current loads are energized, such as by being constantly on or off.

In some embodiments, the PDM 102 may include a test switch 220. The microcontroller 201 may cause a test signal to be sent to various components of the fuel dispenser 10 in response to actuation of the test switch 220. For example, the microcontroller 201 may cause a test sequence to be sent to the CCP 114 or other components of the fuel dispenser 10 and verify the test sequence upon return to the microcontroller 201. In an instance in which the returned test sequence is not the same or a proper response to the transmitted test sequence, the microcontroller 201 may cause an error indication to be generated. In an example embodiment, a service technician can actuate the test switch 220 to verify a complete link from the PDM 102 to the remote computing device. Blink codes on indicator 215 (Heartbeat/CCP) can indicate connection status to the remote command and control center by suspending the heartbeat function temporarily, for example 15 seconds, after pressing the switch, and displaying a diagnostic blink code in that time period. In this way, the service technician can verify proper connectivity of the dispenser itself to the remote command and control center without the need for external equipment such as a Smartphone or laptop computer. Blink codes can indicate partial connectivity in the chain, for example "PDM to CCP," "PDM to site server," "PDM to Internet," thereby enabling efficient system diagnosis.

In another example embodiment, microcontroller 201 may be configured to test the communication to the CCP 114 and/or a remote computing device. In response, CCP indicator 215 may be caused to illuminate in a known manner, or turn off. In an example embodiment, the microcontroller may transmit a watchdog timer signal to the CCP 114 at a predetermined interval, such as once per program cycle. In an instance in which the CCP 114 fails to return the watchdog timer response before a time out, the microcontroller 201 may cause the CCP 114 to reboot, such as cycling power to the CCP 114, and/or cause the CCP indicator to indicate that the CCP 114 failed to return the watchdog timer response.

As discussed above the microcontroller 201 may establish secure communication with a remote computing device through the CCP 114. The secure communications may include a code word cryptographic key authentication and/or real time coded keeping alive messaging. The secured communication may limit or prevent fraudulent control of fuel dispenser power.

In an example embodiment, the DC peripheral components may be remotely monitored or controlled by a remote computing device through the secured communication provided by the CCP 114. For example, the microcontroller 201 may power down one or more of the DC peripheral components in response to receiving a remote power down communication. Remotely powering down one or more peripheral components may allow for a faulted DC peripheral component to be powered off, while other DC peripheral components continue to operate. Similarly, the microcontroller 201 may power up one or more of the DC peripheral components which are de-energized in response to receiving a remote power up communication. In this regard, the microcontroller 201 may cycle power or reboot one or more DC peripheral components in response to receiving a remote reboot communication. The cycling of power may allow for software upgrades to be implemented, clearing of software operational faults, or the like, without local interaction such as by a technician.

In an example embodiment, microcontroller 201 may cause transmission of power quality information and/or power consumption information to the remote computing device through the CCP 114. The power quality information may include power conditions such as "excessive AC transients," "brownout," "shutdown," "false shutdown," "voltage below nominal value," "voltage above nominal value," "excessive power consumption" of individual peripherals, or the like. In some example embodiments, the microcontroller 201 may time stamp the power quality information and/or power consumption information to enable collection of time distributions of the conditions, or the like. The time stamps may allow a user or the remote computing device to discern, for example, between sites which have long-term power quality problems and sites which are experiencing power issues correlating to storm activity.

The microcontroller 201 may, additionally or alternatively, report power consumption information associated with each of the DC peripheral components and/or instances of DC power downs caused by actuation of the interrupt switch 218. In some example embodiments, the microcontroller 201 may cause an indication of CCP reboot to be transmitted to the remote computing device in response to causing the CCP 114 to reboot after failure to receive the watchdog timer response.

In some example embodiments, the microcontroller 201 may monitor and/or record the STP control and indicator circuit 222 for excessive operation time of one or more STPs, which may be indicative of fraud. The microcontroller 201 may cause the operational time of the STPs to be transmitted to the remote computing device via the CCP 114.

In an example embodiment, the microcontroller 201 may be configured to cause the DC peripheral components to be energized incrementally, e.g. one or more DC peripheral components may be energized in a sequence, to limit load surge, e.g. current surge caused by energizing electrical components. The microcontroller may cause the incremental power up of DC peripheral components in response to a remote communication and/or actuation of the interrupt switch 218.

Example Control System

Figure 5:
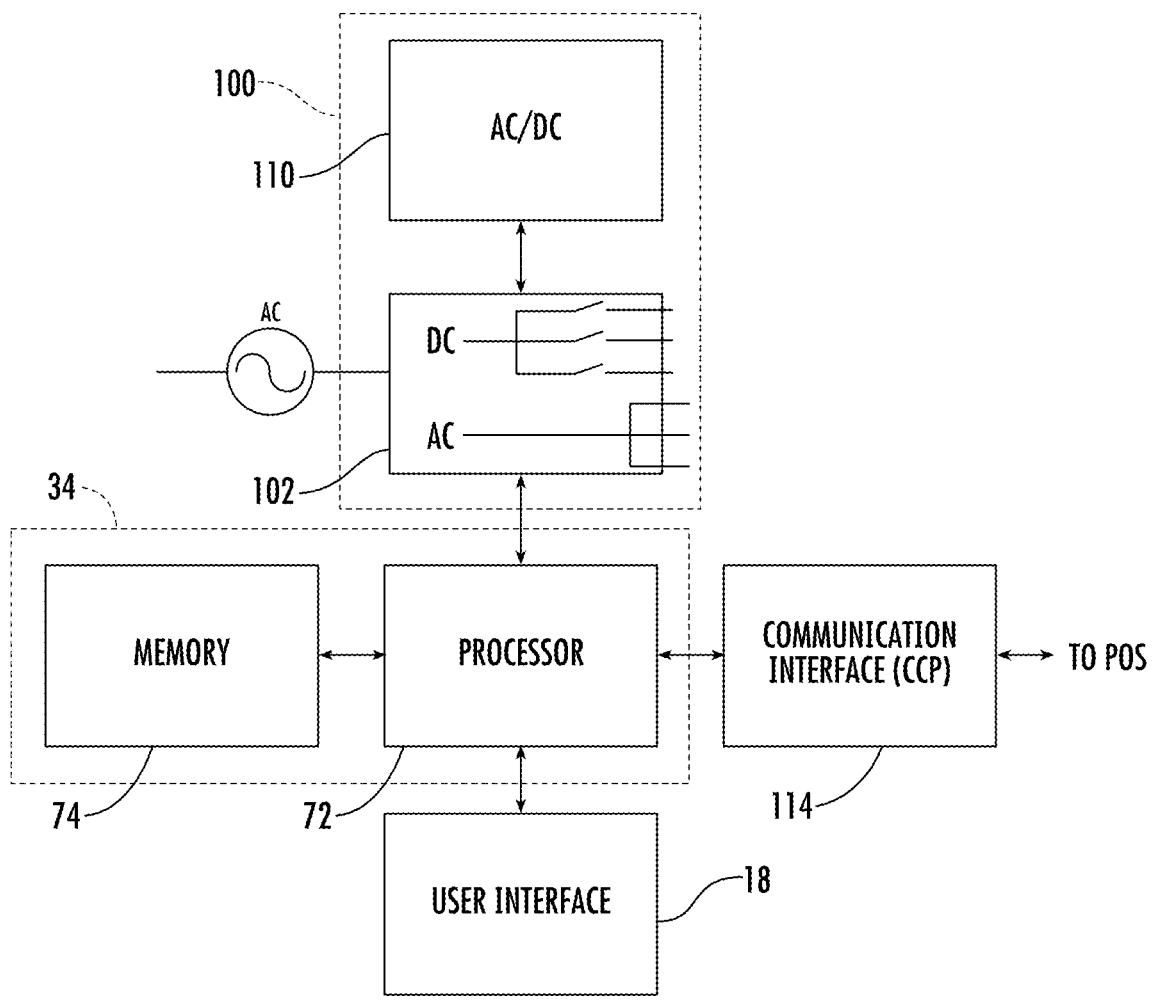
FIG. 5 illustrates a block diagram of one example of a control system according to an embodiment of the present invention.

FIG. 5 shows certain elements of control system 34 for a fuel dispenser 10. The control system 34 of FIG. 5 may be employed, for example, on onboard circuitry within the fuel dispenser 10, in circuitry associated with a convenience store, a network device, server, proxy, or the like. Alternatively, embodiments may be employed on a combination of devices. Furthermore, it should be noted that the devices or elements described below may not be mandatory and thus some may be omitted in certain embodiments.

In an example embodiment, the control circuitry 34 may include or otherwise be in communication with one or more processors 72 (and associated memory 74). As one skilled in the art will recognize, processor 72 is configured to perform data processing, application execution and other processing and management services. In one embodiment, processor 72 may be in communication with or otherwise control customer interface 18 and a communication interface (e.g., CCP 114). As such, processor 72 may be embodied as a circuit chip (e.g. an integrated circuit chip) configured (e.g. with hardware, software or a combination of hardware and software) to perform operations described herein. However, in some embodiments, the processor 72 may be embodied as a portion of a server, computer, or workstation.

CCP 114 may be any means such as a device or circuitry embodied in either hardware, software, or a combination of hardware and software that is configured to receive and/or transmit data from/to a network and/or any other device or module in communication with the control system 34 and/or the point-of-sale (POS) system of the fueling environment (and/or a remote cloud server, either directly or via a router located in the convenience store). In some instances CCP 114 may provide secured, e.g. encrypted, communication between the control system 34, the network, and/or remote servers. CCP 114 may also include, for example, an antenna (or multiple antennas) and supporting hardware and/or software for enabling communications with the network or other devices (e.g. a user device). In some environments, CCP 114 may alternatively or additionally support wired communication. As such, for example, CCP 114 may include a communication modem and/or other hardware/software for supporting communication via cable, digital subscriber line (DSL), universal serial bus (USB) or other mechanisms. In an exemplary embodiment, CCP 114 may support communication via one or more different communication protocols or methods. In some cases, IEEE 802.15.4 based communication techniques such as ZigBee or other low power, short range communication protocols, such as a proprietary technique based on IEEE 802.15.4 may be employed along with radio frequency identification (RFID) or other short range communication techniques.

Control circuitry 34 may also include or otherwise be in communication with power distribution system 100. As described above, power distribution system 100 is operative to receive AC mains power and supply both AC power and DC power (as converted by AC to DC converter 110) to various dispenser peripherals and other components in the retail fueling environment. Preferably, the DC power supplied to the respective peripherals can be supplied or not on an individual basis.

Example Flowchart(s) and Operations

Embodiments of the present invention provide methods, apparatus and computer program products for distributing and/or monitoring power to a fuel dispenser. Various examples of the operations performed in accordance with embodiments of the present invention will now be provided with reference to FIG. 6.

Figure 6:
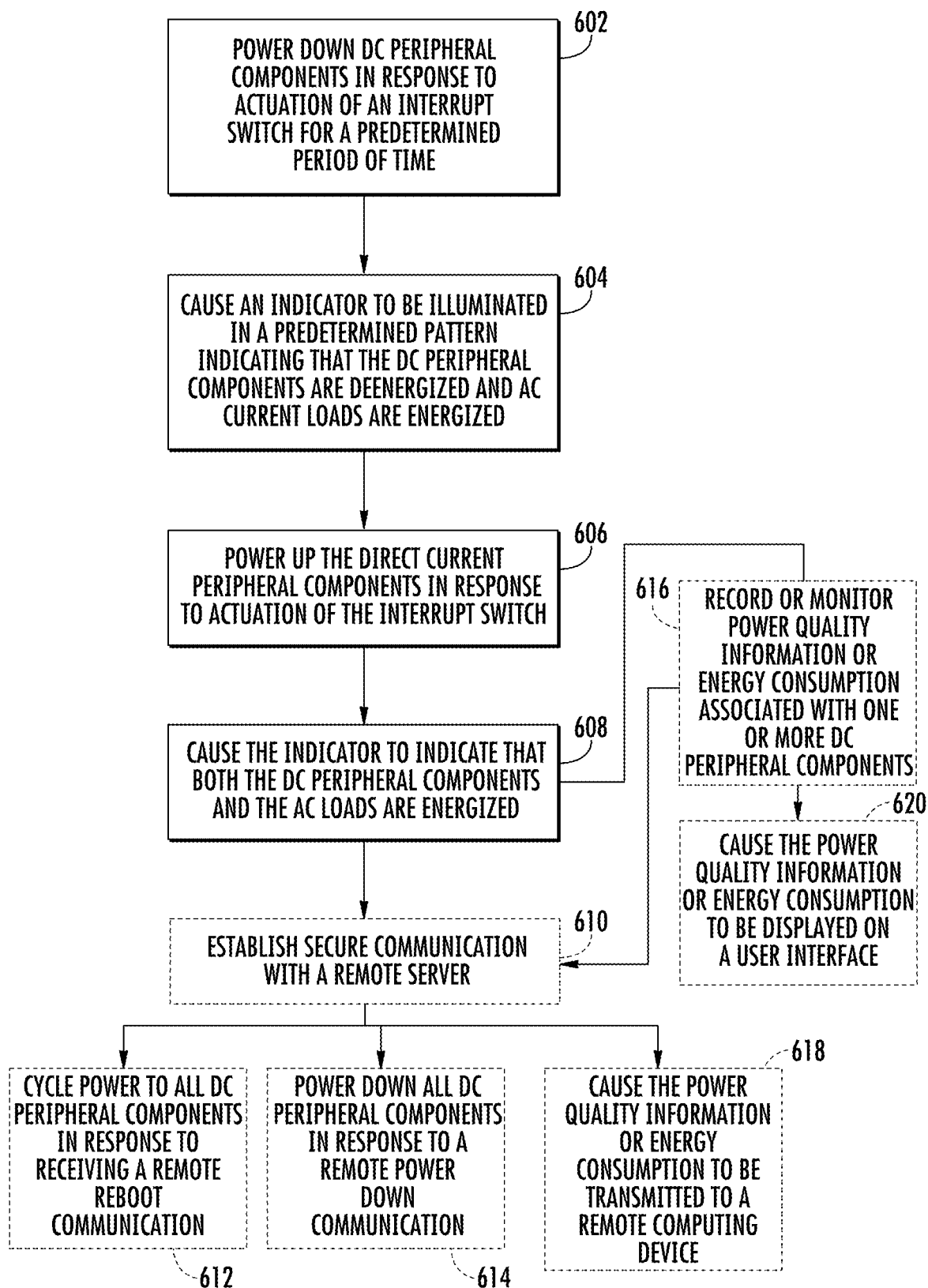
FIG. 6 illustrates a method of utilizing a fuel dispenser according to an example embodiment of the present invention.

FIG. 6 illustrates a flowchart according to an example method for operation of a power distribution system according to certain example embodiments. The operations illustrated in and described with respect to FIG. 6 may, for example, be performed by, with the assistance of, and/or under the control of one or more of the processor 72, memory 74, CCP 114, customer interface 18, and/or power distribution system 100. The methods may include powering down DC peripheral components in response to actuation of an interrupt switch for a predetermined period of time at operation 602, causing an indicator to be illuminated in a predetermined pattern indicating that the DC peripheral components are de-energized and AC current loads are energized at operation 604, and powering up the direct current peripheral components in response to actuation of the interrupt switch at operation 606. The method may also include causing the indicator to indicate that both the DC peripheral components and the AC loads are energized at operation 608.

In some embodiments, the method may include additional, optional operations, and/or the operations described above may be modified or augmented. Some examples of modifications, optional operations, and augmentations are described below, as indicated by dashed lines, such as, establishing secure communication with a remote server at operation 610, cycling power to all DC peripheral components in response to receiving a remote reboot communication at operation 612, powering down all DC peripheral components in response to a remote power down communication at operation 614, and recording or monitor power quality information or energy consumption associated with one or more DC peripheral components at operation 616. The method may further include causing the power quality information or energy consumption to be transmitted to a remote computing device at operation 618 and causing the power quality information or energy consumption to be displayed on a user interface at operation 620.

FIG. 6 illustrates a flowchart of a system, method, and/or computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. As will be appreciated, any such computer program product may be loaded onto a computer or other programmable apparatus (for example, the microcontroller 201) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, microcontroller 201) to cause a series of operations to be performed on the computer or other programmable apparatus to produce a computer-implemented process such that the instructions which execute on the computer or other programmable apparatus implement the functions specified in the flowchart block(s).

In some embodiments, the dispenser may be further configured for additional operations or optional modifications. In this regard, in an example embodiment, the processing circuitry is further configured to establish secured communication with a remote server. In some example embodiments, the processing circuitry is further configured to power down one or more direct current peripheral components in response to receiving a remote power down communication when the one or more direct current peripherals are energized. In an example embodiment, the processing circuitry is further configured to cycle power to one or more direct current peripheral components in response to receiving a remote reboot communication when the one or more direct current peripherals are energized. In some example embodiments, the processing circuitry is further configured to record or monitor power quality information or energy consumption associated with the one or more direct current peripheral components. In an example embodiment, the processing circuitry is further configured to cause the power quality information or energy consumption associated with the one or more direct current peripheral components to be transmitted to a remote computing device. In some example embodiments, the processing circuitry is further configured to cause the power quality information or energy consumption associated with the one or more direct current peripheral components to be displayed on a user interface. In an example embodiment, the user interface comprises only one light element to display the power quality information or energy consumption associated with the one or more direct current peripheral components. In some example embodiments, the power quality information includes real time power quality information displayed on the one light element. In an example embodiment, the power quality information includes historical dispenser power state information displayed on the one light element as a blink code. In some example embodiments, the processing circuitry is further configured to incrementally power up each of the one or more direct current peripheral components to limit load surge. In an example embodiment, the fuel dispenser power distribution system also includes one or more transient energy storage circuits configured to receive the direct current power from the alternating current to direct current converter and provide direct current power to the one or more direct current peripheral components in a predetermined voltage range. The one or more transient energy storage circuits may include one or more power storage elements configured to maintain the direct current in the predetermined voltage range during an interruption of the alternating current power. In some example embodiments, the one or more power storage elements are configured to store sufficient power to allow the processing circuitry to power down the one or more direct current peripherals in response to the interruption in the alternating current power.

Many modifications and other embodiments of the invention set forth herein will come to mind to one skilled in the art to which the invention pertains having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A fuel dispenser comprising:
   a fuel nozzle configured to be connected to a vehicle fuel system;
   fuel piping configured to transfer fuel from a fuel storage tank associated with the fuel dispenser through the fuel nozzle into the vehicle fuel system;
   fuel handling components operative to control and measure flow of the fuel through the fuel piping; and
   a fuel dispenser power distribution system including:
      a power control actuator;
      an alternating current power supply configured to receive alternating current power from a power source and supply alternating current power to one or more alternating current loads associated with the fuel dispenser;
      an alternating current to direct current power converter configured to convert a portion of the alternating current power to direct current power for one or more direct current peripheral components associated with the fuel dispenser; and
      processing circuitry configured to power down the direct current peripheral components in response to actuation of the power control actuator while the alternating current power supply remains active and maintain the direct current peripheral components in a power down state until subsequent actuation of the power control actuator.

2. The fuel dispenser of claim 1, further comprising:
   an indicator;
   said processing circuitry being further configured to:
      cause the indicator to be activated indicating that the at least one direct current peripheral component is de-energized and the alternating current power supply is active;
      power up the at least one direct current peripheral component in response to the power control actuator when the at least one direct current peripheral is de-energized; and
      cause the indicator to be activated to indicate that both the at least one direct current peripheral component is energized and the alternating current power supply is active.

3. The fuel dispenser of claim 2, wherein the processing circuitry is further configured to:
   establish secured communication with a remote computing device.

4. The fuel dispenser of claim 3, wherein the processing circuitry is further configured to:
   power down one or more of the direct current peripheral components in response to receiving a remote power down communication when the one or more direct current peripheral components are energized.

5. The fuel dispenser of claim 3, wherein the processing circuitry is further configured to:
   cycle power to one or more of the direct current peripheral components in response to receiving a remote reboot communication when the one or more direct current peripheral components are energized.

6. The fuel dispenser of claim 2, wherein the processing circuitry is further configured to:
   record or monitor power quality information or energy consumption associated with the one or more direct current peripheral components.

7. The fuel dispenser of claim 6, wherein the processing circuitry is further configured to:
   cause the power quality information or energy consumption associated with the one or more direct current peripheral components to be transmitted to a remote computing device.

8. The fuel dispenser of claim 6, wherein the processing circuitry is further configured to:
   cause the power quality information or energy consumption associated with the one or more direct current peripheral components to be displayed on a user interface.

9. The fuel dispenser of claim 8, wherein the user interface comprises only one light element to display the power quality information or energy consumption associated with the one or more direct current peripheral components.

10. The fuel dispenser of claim 9, wherein the power quality information comprises real time power quality information displayed on the one light element.

11. The fuel dispenser of claim 9, wherein the power quality information comprises historical dispenser power state information displayed on the one light element as a blink code.

12. The fuel dispenser of claim 1, wherein the processing circuitry is further configured to:
   incrementally power up each of the one or more direct current peripheral components to limit load surge.

13. The fuel dispenser of claim 1, further comprising:
one or more voltage regulators configured to receive the direct current power from the alternating current to direct current converter and provide direct current power to the one or more direct current peripheral components in a predetermined voltage range.

14. The fuel dispenser of claim 13, wherein the one or more voltage regulators maintain the direct current at a first voltage value at a high end of the predetermined voltage range.

15. The fuel dispenser of claim 1, further comprising one or more power storage elements configured to maintain the direct current in a predetermined voltage range during an interruption of the alternating current power.

16. The fuel dispenser of claim 15, wherein the one or more power storage elements are configured to store sufficient power to allow the processing circuitry to power down the one or more direct current peripheral components in response to the interruption in the alternating current power.

17. The fuel dispenser of claim 1, wherein the power control actuator comprises a single interrupt switch.

18. The fuel dispenser of claim 17, wherein the single interrupt switch is actuated for a predetermined period of time to power down and power up the one or more peripheral components.

19. A fuel dispenser comprising:
a fuel nozzle configured to be connected to a vehicle fuel system;
fuel piping configured to transfer fuel from a fuel storage tank associated with the fuel dispenser through the fuel nozzle into the vehicle fuel system;
fuel handling components operative to control and measure flow of the fuel through the fuel piping; and
a plurality of direct current peripheral components;
a fuel dispenser power distribution system including:
an alternating current power supply configured to receive alternating current power from a power source and supply alternating current power to one or more alternating current loads associated with the fuel dispenser;
an alternating current to direct current power converter configured to convert a portion of the alternating current power to direct current power for the plurality of direct current peripheral components; and
processing circuitry configured to power up and power down the direct current peripheral components while the alternating current power supply remains active, the processing circuitry being further configured to incrementally power up each of the direct current peripheral components to limit load surge.

* * * * *